United States Patent

Schweidler et al.

[11] Patent Number: 6,058,244
[45] Date of Patent: May 2, 2000

[54] METHOD FOR THE TRANSMITTING/ RECORDING OF VIDEO SIGNALS OF DIFFERENT ASPECT RATIOS

[75] Inventors: Siegfried Schweidler, Garbsen; Heinz Werner Keesen, Hannover, both of Germany

[73] Assignee: Deutsche Thomson Brandt GmbH, Germany

[21] Appl. No.: 08/848,118

[22] Filed: Apr. 28, 1997

Related U.S. Application Data

[63] Continuation of application No. 08/228,175, Apr. 15, 1994, abandoned, which is a continuation of application No. 08/047,416, Apr. 19, 1993, abandoned, and a continuation of application No. PCT/EP91/01701, Sep. 6, 1991.

[30] Foreign Application Priority Data

Sep. 10, 1990 [DE] Germany ............... 40 28 731

[51] Int. Cl.$^7$ ................................ H04N 9/79
[52] U.S. Cl. ............................. 386/131; 348/445
[58] Field of Search ................ 386/1, 40, 44, 386/34, 131; 348/420, 445; H04N 9/79

[56] References Cited

U.S. PATENT DOCUMENTS

| | | | |
|---|---|---|---|
| 4,622,577 | 11/1986 | Reitmeier et al. | 348/445 |
| 4,703,352 | 10/1987 | Kondo | 358/135 |
| 5,036,391 | 7/1991 | Auvray et al. | 348/420 |
| 5,070,395 | 12/1991 | Kitaura | 348/445 |
| 5,122,885 | 6/1992 | Yoshioka et al. | 358/335 |
| 5,159,438 | 10/1992 | Rabii | 348/445 |
| 5,159,460 | 10/1992 | Senso | 358/310 |

FOREIGN PATENT DOCUMENTS 2 169 468  12/1985  United Kingdom ........... H04N 11/06

OTHER PUBLICATIONS

Better Image Video by Jeffrey Friedman, 23rd Annual SMPTE Television Congerence, Feb. 1989, J. Chatel "Compatible Hierarcy Of Studio Standards" pp. 240–253.

*Primary Examiner*—Huy Nguyen
*Attorney, Agent, or Firm*—Joseph S. Tripoli; Peter M. Emanuel; Frederick A. Wein

[57] ABSTRACT

A method for digitally transmitting/recording component-coded color television signals includes the step of, upon transition from a first picture aspect ratio to a second picture aspect ratio obtaining at least part of an additionally required transmitting/recording capacity for coding an additionally formed area of pictures with the second picture aspect ratio by vertical sub scanning of one or more chrominance components.

6 Claims, 3 Drawing Sheets

| 491 | 492 | 493 |   |   |   |   |   |
|-----|-----|-----|---|---|---|---|---|
| 41  | 42  | 43  | 44| 45| 46| 47| 48|

METHOD FOR THE TRANSMITTING/ RECORDING OF VIDEO SIGNALS OF DIFFERENT ASPECT RATIOS

This is a continuation of application Ser. No. 08/228,175, filed Apr. 15, 1994, abandoned, which is a continuation of application Ser. No. 08/047,416, filed Apr. 19, 1993, abandoned and is a continuation of PCT application PCT/EP 91/01701 filed Sep. 6, 1991 by Siegfried Schneidler and Heinz-Werner Keesen and titled "Process, Coder and Decoder For Digital Transmission And/Or Recording Of Component-Coded Color Television Signals".

The invention concerns a method, a coder and a decoder for the digital transmission and/or recording of component-coded color television signals.

BACKGROUND OF THE INVENTION

In the article "Digitales Video" ("Digital Video"), Funkschau No. 19/1986, the properties of a digital 'D1' video recorder and its interfaces are described. The track image of D1 video recorders and the interfaces are standardized in CCIR (European television) standard 601 "Standard for digital interfaces".

Such a D1 video recorder can record a YUV component signal with a scanning frequency of 13.5 MHz for Y and 6.75 MHz for U and for V. The amplitude resolution of the picture element (dot) values for the component signals is 8 bits and a television signal with 625 lines, fields (interlace) and 4:3 aspect ratio (picture format) can be recorded.

Although such D1 video recorders, in comparison to home video recorders, permit recording and playback with a good picture quality, the disadvantages of the interlace method, for example, interline flicker and edge womp, have not yet been examined. Moreover, D1 video recorders are not provided for recording in the 16:9 picture format.

BRIEF SUMMARY OF THE INVENTION

It is the object of the invention to specify a method for the digital transmission and/or recording of component-coded progressive color television pictures with 16:9 picture format, whereby the transmission and/or the recording is originally intended for component-coded fields with 4:3 aspect ratio.

In principle, the method according to the invention is that upon transition from a first picture aspect ratio to a second picture aspect ratio, at least part of an additionally required transmission and/or recording capacity for the coding of the additionally formed area of pictures with the second picture aspect ratio is gained through vertical subscanning of one or more chrominance components.

The color television signals can be transmitted and/or recorded in line form, whereby instead of the chrominance data, the data gained from the luminance component is arranged in the lines or line segments which, according to known arrangements of transmission and/or storage locations, contain the chrominance component(s).

Hereby, luminance data can be arranged within pairs of lines in always a first segment (Y) of the two lines, and data for a first chrominance component in a second segment (U) of the first of the two lines, and data for a second chrominance component in a second segment (V) of the second of the two lines.

The transmission or recording respectively of the coded color television signal in the second picture aspect ratio can be carried out via a transmission line or, respectively, with a facility which is provided for the first picture aspect ratio.

Upon coding the color television signal in the second picture aspect ratio, a block-companding is advantageously used which reduces the data rate required for coding by a factor which is less than three, in particular two.

This block-companding means that a quantitized activity, a quantitized minimum and quantitized picture element difference values are formed and coded for each block, whereby the dependences of these variables upon each other are taken into account.

Advantageous further developments of the method according to the invention result from the associated subclaims.

It is a further object of the invention to specify a coder for the method according to the invention.

In principle, the coder according to the invention is provided with a maximum builder (former of a maximum), a minimum builder, a first subtracter which subtracts the output signals of the minimum builder from the output signals of the maximum builder, With a first quantizer for the output signals of the first subtracter, a second quantizer for the output signals of the minimum builder, a second subtracter which subtracts the output signals of the second quantizer from the picture element values, a third quantitizer for the output signals of the second subtracter, and with a coding circuit which transforms the output signals of the first, second and third quantifiers into a block with a known coding format.

It is further the object of the invention to specify a decoder for the method according to the invention.

In principle, the decoder according to the invention is provided with a facility for determining a maximum and a minimum amplitude step of quantitized picture element difference values, means for evaluating a difference number between these amplitude steps, means for evaluating the minimum amplitude step, means for re-quantitizing of quantitized activity, quantitized minimum and quantitized picture element difference values, and with adders which sum up the minimum and the picture element difference values.

The chrominance components U and V are vertically subscanned. The vacated transmission and/or storage capacity is used to present the additional—compared to the 4:3 picture format—picture area of the 16:9 picture format.

In addition, the component signals are block-companded. The principle of a block-companding is explained in the dissertation "Die Blockkompanidierung digitaler Fernsehsignale" ("The block-companding of digital television signals"), H. W. Keesen, Rhine-Wiestphalia Technical University, Aachen, 1984. For this, two-dimensional blocks of picture elements (Xi, i=1 ... N) are formed. The smallest amplitude value within the block is determined and represents the minimum M. In addition, the difference between the smallest and the largest amplitude value within the block, the activity A, is formed, minimum M and activitvy A are then quantitized (Mq, Aq), the quantitized minimum is subtracted from the values of the picture elements (Xi−Mq= Di), and these picture element difference values Di are subsequently quantitized (Dqi).

Mq, Aq and Dqi are coded and respectively transmitted or recorded.

Advantageously, the maximum quantization error is limited by this method and the larger quantization errors only appear in blocks with greater activity where they are well-masked for a viewer.

By using a special form of coding and with the help of a relatively small expenditure on circuitry, these signals Mq, Aq and Dqi can be formed and respectively recorded on a D1 video recorder or transmitted. The data format of a block coded in this way thereby corresponds advantageously to a data format such as is known for fields in the 4:3 picture format.

BRIEF DESCRIPTION OF THE DRAWINGS

Embodiment examples of the invention are described by means of the drawings. The drawings show in:

FIG. 3 arrangement of component signal picture element values within lines;

FIG. 4 arrangement of data within the data format of a coded block;

DETAILED DESCRIPTION OF THE INVENTION

Figure 1A:
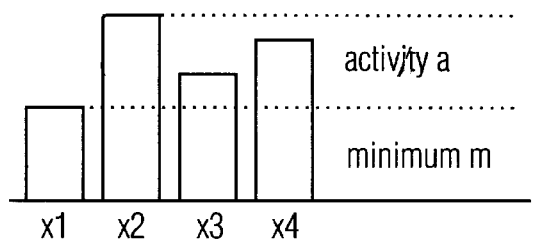
FIG. 1 the principle of the block-companding.

FIG. 1 illustrates a known method of block-companding. In FIG. 1a, the values of four picture elements x1, x2, x3, x4 of a 2*2 picture element block are presented. In this x1 forms the minimum m of this block.

Figure 1B:
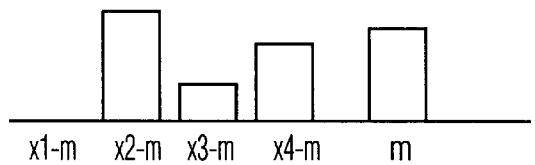

In FIG. 1b, m is subtracted from the four picture element values resulting in the four picture element difference values x1−m, x2−m, x3−m and x4−m. In this x1−m=0 because no quantization was carried out. The difference between the maximum picture element value and the minimum m is, in this case, x2−m. This difference represents the activity 'a' of the block.

Figure 1C:
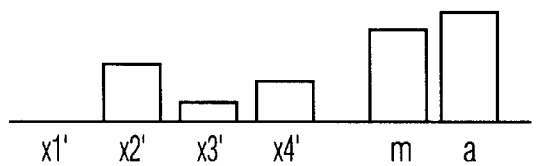

In FIG. 1c, the difference values x1−m, x2−m, x3−m and x4−m are divided by 'a', resulting in the values x1', x2', x3' and x4'.

Figure 2:
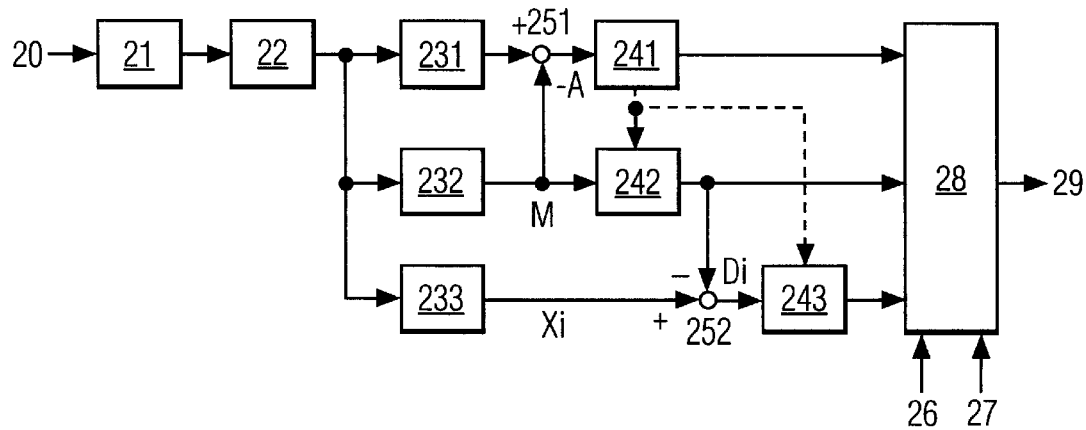
FIG. 2 block circuit diagram of a coder according to the invention.

A block circuit diagram for a coder with block-companding is illustrated in FIG. 2. The Y-component, for example, is fed to an input 20 and converted into a serial digital signal in an analog-to-digital converter 21. Blocks each consisting of, for example, 4*4 picture element values are formed from this in a line-to-block converter 22. The line-to-block converter 22 can, in this case, contain three or four line memories. The output signal of the line-to-block converter 22 is fed to a maximum builder 231, a minimum builder 232 and to a delay circuit 233 for transit time compensation. The smallest picture element value of the respective block determined in the minimum builder 232 is subtracted from the largest picture element value of the respective block in a first subtracter 251, and represents the activity of the Y-component of this block. The activity value is quantitized in a first quantitizer 241 and the minimum is quantitized in a second quantitizer 242, whereby the second quantitizer 242 is controlled by an output signal from the first quantitizer 241.

The quantitized minimum of the block is subtracted from each of the picture element values of the block in a second subtracter. The picture element difference values resulting from this pass to a third quantitizer 243 which is also controlled by the output signal from the first quantitizer 241. The third quantitizer 243 can have, for example, 11 steps.

The quantitized picture element difference values, the quantitized minimum and the quantitized activity are then transformed in a coding circuit 28 into a data format corresponding to that of FIG. 4.

The same is valid for the block-companded U- and V-components (activity, minimum, picture element difference values) which are also fed via inputs 26 or inputs 27 respectively to the coding circuit 28.

The block-companded and transformed YUV components are output serial-wise from the output of the coding circuit. Differential (error) protection signals can still be added to these signals prior to their transmission or recording respectively.

FIG. 3 shows the sequence in which the component signals are recorded on a D1 video recorder.

FIG. 3a shows a known arrangement for the active part of a line of a recorded color television signal. The YUV component signals are arranged respectively line-wise in series in the sequence U12, Y1, V12, Y2, U34, Y3, V34, Y4, . . . , whereby Y1, Y2, Y3, . . . are Y picture element values for the picture elements of the line and U12, V12, U34, . . . are the associated U and V picture element values. Y1 and Y2 each have a common U and V picture element value U12 and V12.

Every line hereby contains 720 Y, 360 U and 360 V picture element values, each with 8 bits. Thus, one line contains 1440 bytes which are divided into 180 blocks each of 8 bytes. Hereby, the values 0 and 255 from the range 0 through 255 representable with 8 bits are not used for the picture element values of the YUV components.

One field with 288 active lines therefore contains 720*288=207360 Y picture element values and always 360*288=103680 U or V picture element values respectively, i.e. in total 414720 YUV picture element values. This applies to a 4:3 picture aspect ratio.

A full frame in the 16:9 aspect ratio with the same spatial Y-horizontal resolution requires 2*207360*(16/9)/(4/3)= 552960 Y picture element values. In the D1 video recorder the U and V components in the horizontal direction have one-half the resolution of the Y component, and in the vertical direction, the full resolution of the Y component.

According to a recommendation of the CCIR, the resolution in the vertical and horizontal directions should be nearly equal.

Now, if one wants to make the resolutions for the UV components the same in both directions, one can subscan these components in the vertical direction using the factor two. Therewith, the U and V components per frame in the 16:9 picture format each require 288*1360*(16/9)/(4/3)= 138240 picture element values, in total 2*138240=276480.

Consequently, for a full frame with progressive 16:9 aspect ratio and vertically subscanned color components, there results a total number of 552960+276480=829440 picture element values of 8 bits each. In order to be able to record such frames on a D1 video recorder a data compression by a factor of 829440/414720=2 must be carried out. This is achieved, for example, through the block-companding described for FIG. 2. A high picture quality is advantageously maintained through the relatively low compression factor and due to this special form of data reduction.

One possible distribution of the picture element values for the progressive 16:9 aspect ratio within two successive lines is illustrated in FIG. 3b and FIG. 3c.Each line can contain 960 Y picture element values and 480 chrominance picture element values. The line in FIG. 3b can also contain the V component and the line in FIG. 3c the U component. The distribution within the lines is hereby advantageously adjusted for an error correction technique (interleaving, shuffling, concealment) which is known or is similar in principle.

FIG. 4 illustrates how a block of eight YUV picture element values of a D1 video recorder with eight bytes (=8*8 bits) can be utilized in order to therein record or transmit respectively 16 block-companded and quantitized picture element difference values Dqi, for example, of the Y component, of a 4*4 picture element block with the associated quantitized minimum Mq and the associated quantitized activity Aq. In the eight compartments 41 through 48 of 7 bits each, always two quantitized picture element difference values Dqi, Dqi+1 are arranged. The quantitized activity Aq is coded by means of the two compartments 491 and 492 and the quantitized minimum by means of the compartment 493 with 6 bits. In doing this the dependences of the variables with respect to each other are advantageously utilized. Using the special form of coding helps to achieve that only negligible decoding errors occur with low activities. Somewhat larger decoding errors only appear with higher activities (i.e. parts of the picture which are rich in detail) where thy are masked for the viewer.

The picture element difference values Di are quantitized in the third quantitizer 243 in FIG. 2 using 11 steps S0 through S10, depending on the activity. As always two picture element difference values are combined, there appear 11*11=121 data values. These can be represented respectively with 7 bits and are arranged in the compartments 41 through 48.

As the sum of activity A and minimum M must lie in the region of 0 through 255 (8 bit resolution), only low values of M can occur with high values of A. By using the special coding the quantitized activity Aq can be unambiguously represented using 2 bits and the quantitized minimum by using 6 bits.

The 11 steps S0 through S10 and plausible representative values Ari for the quantitized activity Aq result, for example, from the following regions for A:

| A | Step | Ari | | | |
|---|---|---|---|---|---|
| 0 | S0 | 0 | | | |
| 1 | S1 | 1 | | | |
| 2 and 4 | S2 | 2, | 3 | | |
| 3 and 5 ... 7 | S3 | 3, | 4, | 7 | |
| 8 ... 17 | S4 | 9, | 11, | 13, | 15 |
| 18 ... 29 | S5 | 18, | 22, | 24, | 27 |
| 30 ... 48 | S6 | 32, | 35, | 39, | 45 |
| 49 ... 79 | S7 | 52, | 60, | 67, | 75 |
| 80 ... 121 | S8 | 85, | 93, | 102, | 114 |
| 122 ... 179 | S9 | 127, | 142, | 156, | 171 |
| 180 ... 255 | S10 | 189, | 204, | 225, | 247 |

If, for example, the activity A is within the range 180 through 255 then step S10 is present and, through the quantitizing of A, the representative values Ari 189, 204, 225 or 247 result. When the activity A is smaller than 180, consequently step S9 can be present at best. The activity range for step S10 and the following steps S9, S8, S7, . . . , is always subdivided in four activity classes with the corresponding representative values. In coding circuit 28 the four activity classes within one step are coded with the 2 bits of the compartments 491 and 492. Then a maximum picture element value of 189+63=252 can be expressed from, for example, the sum of the lowest representative value 189 in step S10 and the six bits for the minimum in compartment 493. This is sufficient because the picture element values 0 and 255 are not to be coded.

The difference between the largest occurring step number and the smallest occurring step number can be determined within every, single block according to FIG. 4. How the two bits for the quantitized activity, in the compartments 491 and 492 are to be interpreted in a decoder is established according to this difference. For example, if this step difference has a value of 10 (i.e. the quantitized picture element difference values Dqi occupy at least the smallest and the largest of the possible output values of the third quantitizer 243 in FIG. 2), then only an activity range corresponding to step S10 can be present. With the two bits in the compartments 491 and 492, the four representative values 247, 225, 204 or 189 can then be coded unambiguously.

If the step difference value is, for example, 7, then only an activity range corresponding to step S7 with the representative values 75, 67, 60 or 52 for the quanzized activity can be present. Again, with the two bits in the compartments 491 and 492, these four representative values Ari can then be coded unambiguously.

With smaller activities the six bits in compartment 493 representing the quantitized minimum Mq (0 through 63 can be expressed thereby) are no longer sufficient for coding a value of Mq which is greater than 63. Supplementary information for coding the quantitized minimum Mq can be transmitted or recorded respectively by means of the occupied step numbers within the compartments 41 through 48 because, as a matter of course, step S0 would always be occupied through the subtraction of Mq from the picture element values.

For example, if the occupied step numbers are 0, 3, 4, 9, 1, 5, . . . , and step 9 is the largest in this block, then a minimum representative value of 127 can be present and a value between 1 and 254−127=127 can be necessary for the minimum. Now, in coding circuit 28 the value one is added to the step numbers if the minimum lies within the range 64 through 127, resulting in the new numerical values 1, 4, 5, 10, 2, 5, . . .

A decoder can detect that the step S0 is not occupied. Therefore, in this case the value 64 is added once to the quantitized minimum Mq which has been coded with 6 bits. If, prior to the coding, Mq had been in the range 0 through 63, then the step numbers would have remained unaltered in the coding circuit 28.

If the activity range results in the step S8, then either a 0, or 2 can be added to the step numbers, and with step 7 or lower steps either a 0, 1, 2 or 3 in coding circuit 28. Hereby, the value two corresponds to an addition of 2*64, and the value three an addition of 3*64 to the quantitized minimum. Thereby, Mq can be coded taking into consideration the respective activity within the entire range 0 through 255.

In order to suppress, within a complete block according to FIG. 4, the values 0 and 255 which cannot be recorded by a D1 video recorder, in the coder, for example, always the value one is added, at the output of the coding circuit 28, to the fields 41 through 48 which can be interpreted as numbers from the dual system with the there-above lying bit from the compartments 491, 492 or 493 and is, at the input of a decoder, correspondingly subtracted. This is possible because the seven bits from the compartments 41 through 48 each occupy only a number range of 11*11=121 (instead of a number range of 128 values).

The lowest activity classes no longer require always four representative values An. This fact allows additional data to be transmitted or recorded respectively within the blocks by means of appropriate measures. If the step number is lower than 9, then activity and minimum can additionally be coded in combined form. For example, the quantitized minimum can be coded using 8 bits at step S7, whereby five different activity ranges with seven steps are then possible.

Likewise, in the complete activity or, respectively, minimum range, the subdivision for the activity coding with the compartments 491 and 492, and for the minimum with the compartment 493, need not be fixed. As minimum and activity are smaller than/equal to 255, the following coding, for example, can also be selected: while Aq=250 then Mq<6; while Aq=230 then Mq<26.

| Aq | Mq | Code word in the compartments 491 thru 493 |
|---|---|---|
| 250 | 0 | 0000 0000 |
| 250 | 1 | 0000 0001 |
| . | . | . |
| . | . | . |
| . | . | . |
| 250 | 5 | 0000 0101 |
| 230 | 0 | 0000 0110 |
| 230 | 1 | 0000 0111 |
| . | . | . |
| . | . | . |
| . | . | . | etc. The respective code words are here continuously counted upwards in binary form. Thereby, all available, possible code words are utilized.

Figure 5:
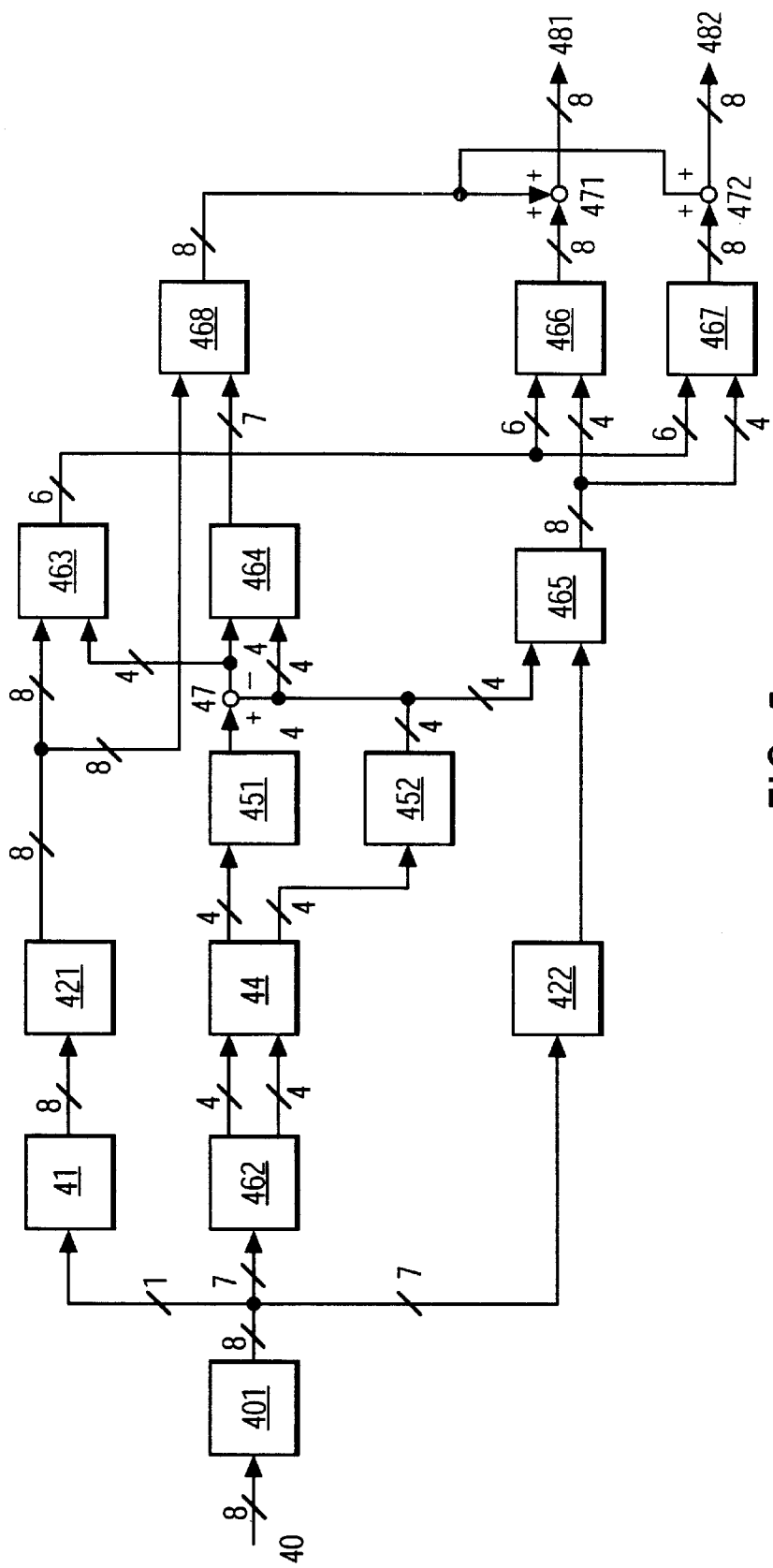
FIG. 5 block circuit diagram of a decoder according to the invention.

FIG. 5 shows a decoder in the form of a block circuit am. Input 40 receives, for example, the Y component of the color television signal which has been transmitted or recorded in data reduced form. The decoder contains eight look-up circuits. These may consist of PROM (programmable read-only memory) circuits. The input data is fed in as address, the output data is read out as stored numerical values at these addresses.

In the first look-up circuit 401, the value of one which was added at the output of coding circuit 28 is subtracted again, instead of a value range which does not contain 0 and 255, a value range of, for example, 0 through 253 is regenerated thereby. Every 7 bits from the compartments 41 through 48 are fed to a second look-up circuit 462 and a second delay circuit 422 which causes a delay of approx. 10 cycles. The 8 bits arriving in serial form from the compartments 491, 492 and 493 are converted in a serial-to-parallel converter 41 into parallel data words each of 8 bits, and delayed by approx. three cycles in a delay circuit 421.

In the second look-up circuit 462, from the always 7 bits two quantitized picture element difference values Dqi, Dqi+1 are obtained, each with a word width of 4 bits and eleven possible steps S0 through S10, whereby always the larger of the two quantitized picture element difference values is available at a first output and the respective smaller of the two picture element difference values at a second output. In a subsequent detector circuit 44, respectively the largest and the smallest quantitized picture element difference value of the respective block is determined and the maximum quantitized picture element difference value is fed via a first output to a first intermediate memory 451 and the smallest quantitized picture element difference value is fed via a second output to a second intermediate memory 452. The intermediate storing is carried out for the processing of one block respectively.

The smallest quantitized picture element difference value, i.e. the lowest step, is subtracted from the largest quantitized picture element difference value, i.e. the highest step, in a subtracter 47. This results in a difference value which represents the number of occupied steps in the block and is a measure for the activity range in the block.

This difference value and the bits from the compartments 491, 492 and 493 are fed to a third lookup circuit 463. From this, the look-up circuit determines the re-quantitized activity of the respective 4*4 block.

The difference value which represents the number of occupied steps and the quantitized smallest picture element difference value are fed to a fourth look-up circuit 464. A variable for computing the original minimum M is determined in this look-up circuit.

In a fifth look-up circuit 465, the quantitized smallest picture element difference value, i.e. the lowest occupied step, is subtracted from the output signal of the second delay circuit 422, i.e. from the steps transmitted or recorded respectively, and thereby the original step number is reproduced with the lowest step S0 in every block. The output signal represents, each with a word width of 4 bits, the two original step numbers for the pair of quantitized picture element difference values Dqi, Dqi+1.

This pair of picture element difference values is fed to a sixth 466 and a seventh 467 look-up circuit together with the output signal from the third look-up circuit 463. In these two look-up circuits, the quantization of the picture element difference values carried out in the coder is reversed.

The 8 bits from the compartments 491, 492 and 493, and the output signal from the fourth look-up circuit 464 are fed to an eighth look-up circuit 468. The original minimum M is redetermined from these two signals and, in a first adder 471 and a second adder 472, added to the re-quantitized picture element difference values. Two out of a total of sixteen picture element values of the block are then available at the outputs 481 and 482 respectively.

The picture element values of 4*4 blocks for the U and V components are decoded in a corresponding manner.

In the case of other numbers of lines (525 lines), frame repetition rates (59.94 or 60 Hz) or picture aspect ratios, the relevant numerical values and arrangements can be adapted corresponding to the approach indicated by the invention.

The functioning of the coding circuit 28 in FIG. 2 is described by the following FORTRAN program for a computer of the type VAX 8550:

```
INTEGER*4  IAKT(0:255), IBLOCK(8), IDAT(16)
REAL*4     DIVI(0:255), DIV
C
DIV=DIVI(IAK)                    !IAK: Activity
C                     !DIVI: Field with the possible output
siC                          signals from the first quantizer
241
IH=IAK/DIV
IHM=IAK/DIV
IHM=(IHM+1)*DIV
IHM=(IHM-IAK)/2
MIN=MIN-IHM                      !Minimum-correction
IF (MIN.LT.O) MIN=0              !MIN: Quantized minimum
C
DO I=1,16             !IBLOCK: Compartment with the 4*4 picture
                              element values
    IBLOCK(I)=(IBLOCK(I)-MIN)/DIV
ENDDO                 !IBLOCK: Compartment with quantized picture
                              element difference values
C
IAKO=IAKT(IAK)        !IAKO: Bits for the compartments 491 and
                              492
C
DO I=1,16
    IDAT(I)=IBLOCK(I)+MIN/64
ENDDO
ICOD(1)=11*IDAT( 1)+IDAT( 5)+ (IKAO.AND.2)*  64+1
ICOD(2)=11*IDAT( 2)+IDAT( 6)+ (IKAO.AND.1)*128+1
ICOD(3)=11*IDAT( 3)+IDAT( 7)+ (MIN.AND.32)*   4+1
ICOD(4)=11*IDAT( 4)+IDAT( 8)+ (MIN.AND.16)*   8+1
ICOD(5)=11*IDAT( 9)+IDAT(13)+ (MIN.AND. 8)*  16+1
```

```
ICOD(6)=11*IDAT(10)+IDAT(14)+ (MIN.AND.  4)*  32+1
ICOD(7)=11*IDAT(11)+IDAT(15)+ (MIN.AND.  2)*  64+1
ICOD(8)=11*IDAT(12)+IDAT(16)+ (MIN.AND.  1)*128+1
C
```

Hereby, ICOD(1) . . . ICOD(8) are the bytes from the compartments 41 through 48 with the associated bits of the compartments 491, 492 and 493 respectively. The value of one in the fourth addend serves for suppressing the values 0 and 255.

The third addend of ICOD(1) and ICOD(2) is the bit from the compartments 491 or 492 respectively.

IAKT and DIVI are compartments in the computer for the value range 0 through 255 from which a quantization factor and the two bits for the compartments 491 and 492 are obtained depending on the activity. The contents of these compartments are obtained according to the following rule:

```
        L=1
            ICW=10
            DIV=255.5/11.
            IDIV=DIV*2+0.99
            DIV=IDIV/2.
            DO I=255,0,-1
                IWE=(I)/DIV
                IF (IWE.LT.ICW) THEN
                    DIV=(FLOAT (I) +0.5)/FLOAT(ICW+1)
                    IDIV=DIV*2+0.99
                    DIV=IDIV/2
                    IF (DIV.LT.1.) DIV=1
                    L=L+1
                    IF (L.GT.4) THEN
                        ICW=ICW-1
                        DIV=(FLOAT (I) +0.5)/FLOAT(ICW+1)
                        IDIV=DIV*2+0.99
                        DIV=IDIV/2.
                        IF (DIV.LT.1.) DIV=1.
                        L=1
                    ENDIF
                ENDIF
                IWE=(I) /DIV
                IAKT(T) =L-1
                DIVI (I) =DIV
            ENDDO.
```

We claim:

1. A method of digitally transmitting/recording line-oriented component-coded television signals in which, in order to change from a first aspect ratio to a second aspect ratio instead of the first aspect ratio, at least a part of required additional transmitting/recording capacity is obtained through under sampling of components, comprising the steps of:

transmitting/recording the coded television signal in said second aspect ratio from a facility provided for the first aspect ratio;

vertically under sampling at least one chrominance component of the coded television signal transporting a picture with said second aspect ratio;

transporting a picture with said first aspect ratio data obtained from luminance or chrominance of the television signal, transporting a picture with said second aspect ratio being arranged instead of original chrominance data of the television signal having said first aspect ratio, and further including block companding luminance and chrominance components of a plurality of pixel values by applying the steps of;

determining a maximum and a minimum pixel value for each of said blocks, subtracting said minimum pixel value from said maximum pixel value to obtain an activity value, subtracting said activity value from each of said pixel values, and transmitting/recording each value of said block with reduced length and together with said activity value, comprising the steps of;

quantitizing said activity value with a non-uniform characteristic and a fixed number of steps to obtain a quantitized activity value;

quantitizing said minimum pixel value using a step number to obtain a quantitized pixel value, subtracting a quantitized minimum value from each of said quantitized pixel value to obtain difference pixel values controlled by said step number; and coding said quantitized activity value using the difference between the largest and the smallest step number.

2. The method of claim 1 wherein the largest unoccupied step numbers are determined for each block at the coder end and said quantitized minimum is coded by adding a number corresponding to the step numbers and that the minimum occupied step number is used for decoding the quantitized minimum at the decoder end.

3. The method of claim 1 wherein for each block with 2*N single-byte pixel values of said luminance, the or the second chrominance component, said quantitized activity, said quantitized minimum, and said quantitized pixel difference values are coded in a block having N bytes, N being at least 8.

4. The method of claim 3 wherein within each block two bits are used to code said quantitized activity value, six bits are used to code said quantitized minimum pixel value and seven bits are used to code a pair of said pixel difference values.

5. The method of claim 1 wherein the value one is added to the words of the blocks at the coder end before the transmission/recording, the number of words is limited to the second-largest possible value and the value one is subtracted at the decoder end.

6. The method of claim 1 wherein additional data are inserted in blocks having smaller quantitized activity values at the coder end and are taken out at the decoder end.

* * * * *